US005608960A

United States Patent [19]

Nyhuis et al.

[11] Patent Number: 5,608,960

[45] Date of Patent: Mar. 11, 1997

[54] APPARATUS AND METHOD FOR MOUNTING A SUPPORT COLUMN TO A CHAIR BASE AND TILT CONTROL HOUSING

[75] Inventors: Robert Nyhuis, Holland; Brent Fredricks, Grand Haven; Martin Van Ryckeghem, Holland, all of Mich.

[73] Assignee: Herman Miller, Inc., Zeeland, Mich.

[21] Appl. No.: 487,804

[22] Filed: Jun. 7, 1995

[51] Int. Cl.$^{6}$ .............. B23P 11/00

[52] U.S. Cl. .............. 29/434; 29/525; 29/255

[58] Field of Search .............. 29/434, 525, 254, 29/255; 81/463

[56] References Cited

U.S. PATENT DOCUMENTS

| | | | |
|---|---|---|---|
| 3,052,955 | 9/1962 | McAndrews et al. | 29/525 |
| 3,436,048 | 4/1969 | Greer | 248/397 |
| 4,108,416 | 8/1978 | Nagase et al. | 248/400 |
| 4,245,826 | 1/1981 | Wirges | 267/131 |
| 4,265,008 | 5/1981 | Lippacher et al. | 29/254 |
| 4,415,135 | 11/1983 | French | 248/161 |
| 4,485,996 | 12/1984 | Beukema et al. | 248/407 |
| 4,580,749 | 4/1986 | Howard | 248/161 |
| 4,692,057 | 9/1987 | Lauderbach | 403/334 |
| 4,716,644 | 1/1988 | Crotti | 29/525 |
| 4,720,068 | 1/1988 | Tornero | 288/162.1 |
| 4,756,496 | 7/1988 | Hosan et al. | 248/161 |
| 4,793,197 | 12/1988 | Petrovsky | 74/89.15 |
| 4,844,392 | 7/1989 | Bauer et al. | 248/162.1 |
| 4,848,524 | 7/1989 | Hosan et al. | 188/322.17 |
| 4,852,231 | 8/1989 | Turner | 29/255 |
| 4,876,782 | 10/1989 | Carpinella et al. | 29/255 |
| 4,899,969 | 2/1990 | Bauer et al. | 248/161 |
| 4,940,202 | 7/1990 | Hosan et al. | 248/162.1 |
| 4,969,619 | 11/1990 | Bauer et al. | 248/161 |
| 4,997,150 | 3/1991 | Mardollo | 248/161 |
| 5,078,351 | 1/1992 | Gualtieri | 248/161 |
| 5,120,011 | 6/1992 | Mintgen et al. | 248/162.1 |
| 5,234,187 | 8/1993 | Teppo et al. | 248/161 |

FOREIGN PATENT DOCUMENTS

| | | |
|---|---|---|
| 0483806A1 | 5/1992 | European Pat. Off. . |
| 81210414 | 3/1993 | Taiwan . |
| 2031057 | 4/1980 | United Kingdom . |

*Primary Examiner*—David P. Bryant
*Attorney, Agent, or Firm*—Brinks Hofer Gilson & Lione

[57] ABSTRACT

An apparatus and method is provided for mounting a support column to a chair base having a cavity formed therein and tilt-control housing having a hub defining a core. The support column has a top portion and a bottom portion. The apparatus includes a support structure, a vertical shaft and a mass positioned within a vertical housing. In operation, the base is supported by the support structure. The bottom portion of the support column is placed in the cavity of the base and the hub of the tilt-control housing is placed on the top portion of the support column. An impact force is applied against the tilt control housing to simultaneously press fit the top portion of the support column within the hub and the bottom portion of the column within the cavity.

24 Claims, 10 Drawing Sheets

APPARATUS AND METHOD FOR MOUNTING A SUPPORT COLUMN TO A CHAIR BASE AND TILT CONTROL HOUSING

BACKGROUND OF THE INVENTION

The present invention relates generally to support columns for chairs, tables and the like, and more particularly, to a novel apparatus and method for mounting a support column to a chair base and chair tilt-control housing.

It is well known in the prior art that a support column can be used to interconnect an object to be supported, such as a chair seat, and a supporting structure, such as a chair base. In general, the support column carries the load imposed by the object being supported and transfers it to the supporting structure. The use of a simple support column thereby eliminates the need for multiple load bearing members. There are many types of commercial support columns currently used in a variety of applications. For example, a simple rigid member of fixed height can be interposed between a chair seat and base to provide support. This type of support member is embodied, for example, in a typical bar stool. More recently, support columns have been made height-adjustable, thereby giving the user more flexibility in their use of the object. For example, a height-adjustable chair can accommodate users of different heights when accessing a fixed elevation work station. Alternatively, a single user can adjust the height of the chair to access work stations of varying elevation.

Typically, height-adjustable support columns include telescopically movable tubular members. For example, a support column can include a guide tube attached to the chair base and a telescopic tube attached to the seat. A piston-cylinder type gas spring is used to actuate the telescopic tube, thereby raising or lowering the seat according to the user's preference. For example, one such support column is described in U.S. Pat. No. 4,580,749, issued Apr. 8, 1986, and entitled Support Column Unit.

As stated previously, the load imposed by the seat must be transferred to the support column, which in turn, transfers it to the base. To effectuate this load transfer properly, it is important to have the seat and base firmly mounted to the support column. Typically, the support column is inserted in a cavity located in the base. To allow for proper load transfer, the support column is typically press fitted into the cavity by applying a static force to the column while providing for an opposing reaction force against the base. Conversely, the static force can be applied to the base while supporting the support column. Alternatively, an impact force can be applied by a human operator wielding a rubber mallet or other impact type device.

Similar to the base, a chair seat typically has a hub adapted for mounting the seat to the support column. Alternatively, some chairs are designed to allow the user to tilt the chair. Such tilt-chairs typically have a tilt control housing and mechanism which support the chair seat as shown in U.S. Pat. No. 5,333,368, issued Aug. 2, 1994, and entitled Chair Control With Forward Tilt. The tilt-control housing generally has a hub and a core adapted for mounting to the support column. As with the base, the tilt control housing is press fitted onto the support column by applying either a static or impact force, while providing for an opposing reaction force.

The aforementioned method of mounting the support column to the tilt control housing and base has several disadvantages. First, when human operators manually apply the impact force to the support column, base or tilt control housing, there is necessarily a lack of uniformity in the amount of force applied to each chair being assembled. Therefore, some support columns may be more firmly mounted in the base and tilt-control housing than others. Moreover, since a separate static or impact force is used to mount each of the base and tilt-control housing to the support column, each base or tilt-control housing can be mounted more or less firmly than the other on any particular chair. Furthermore, the two-step process of mounting the support column on the base and then mounting the tilt control housing to the support column is time consuming and inefficient, thereby increasing the costs of manufacturing.

SUMMARY OF THE INVENTION

Briefly stated, the invention is directed to an apparatus and method for mounting a support column to a chair base and a tilt-control housing by applying a uniform, single impact force. The support column has a top portion and a bottom portion. The base has a cavity formed therein and the tilt-control housing has a hub defining a core. The bottom portion of the support column is placed within the cavity of the base and the hub of the tilt-control housing is placed onto the top portion of the support column such that the top portion is positioned within the core of the hub. A bottom side of the base is then supported while an impact force is applied against the tilt-control housing to simultaneously press fit the top portion of the column within the hub and the bottom portion within the cavity of the base.

The process can also be adapted to mount a telescopic support column in a base and tilt-control housing. The telescopic support column typically has a guide tube and a telescopic tube. The telescopic tube has a control pin extending upwardly through a top wall of the tube. When depressed, the control pin actuates a gas spring such that the telescopic tube can be moved within the guide tube, thereby collapsing the support column. Once collapsed, an impact force is applied to the tilt control housing to simultaneously press fit the bottom portion into the cavity and the top portion into the hub. In an exemplary embodiment, the control pin is depressed by extending a vertical shaft downwardly against the control pin from a pneumatic cylinder assembly. The pneumatic cylinder assembly also extends the vertical shaft to collapse the support column. The impact force is applied by dropping a mass onto the vertical shaft. The vertical shaft transfers the impact force to the tilt control housing.

When using the mass to provide the impact force, the process can also involve the step of raising the mass to an upper position so that it can be used in subsequent mounting operations. In an exemplary embodiment, the mass is raised by an opposing force imparted by the vertical shaft. The mass can also be locked in the upper position so that the vertical shaft can be lowered onto the tilt control housing in preparation for mounting.

An apparatus for mounting the support column is also described herein. The apparatus has a support structure adapted to support the bottom side of the base, a vertical shaft adapted to move downwardly to operably engage the tilt control housing and a vertical housing positioned above the tilt control housing. A mass is positioned within the vertical housing so as to be aligned with the vertical shaft. In an exemplary embodiment, the vertical shaft includes a downwardly extending piston rod and an upwardly extending piston rod. The mass is adapted to fall by gravity into engagement with the vertical shaft, thereby imparting an impact force to the tilt-control housing through the vertical shaft as the support structure applies an opposing reaction force to the bottom side of the base, simultaneously press fitting the top portion of the column within the hub and the bottom portion of the column within the cavity. To accommodate the telescopic tube having a control pin, the vertical shaft is adapted to depress the control pin while simultaneously engaging the tilt control housing.

One object of the present invention is to provide a method and apparatus for performing that method, whereby the support column is mounted onto the base and tilt-control housing by a single impact force applied uniformly each time the method is performed. This process eliminates the need for a two-step mounting procedure. Furthermore, by using a mechanical impact force, the same impact force is applied each time the method is performed. The present invention provides significant advantages over other types of mounting processes by providing an inexpensive and efficient way of mounting the support column while simultaneously improving the quality and consistency of the press fits.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
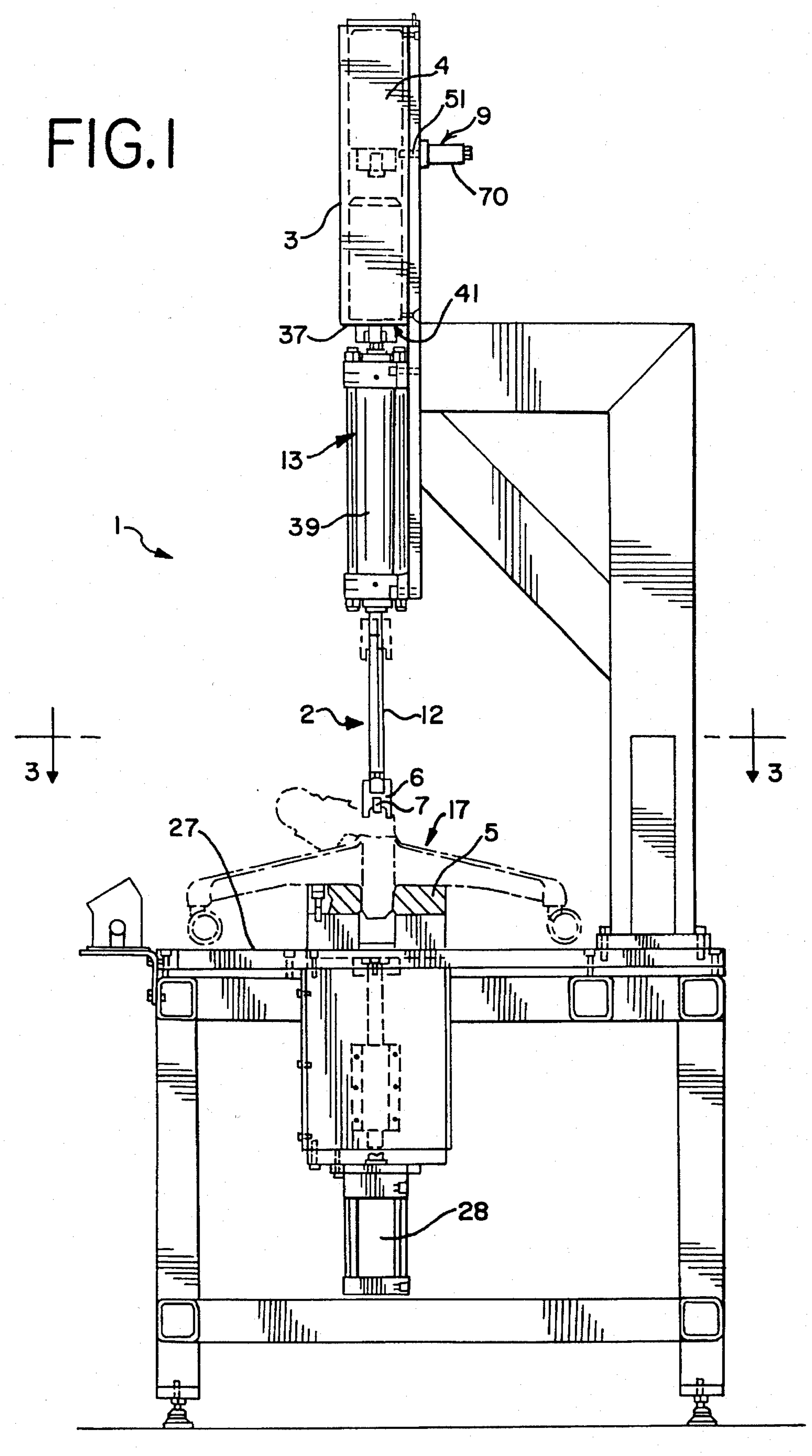
FIG. 1 is a side view of the apparatus.
Figure 4:
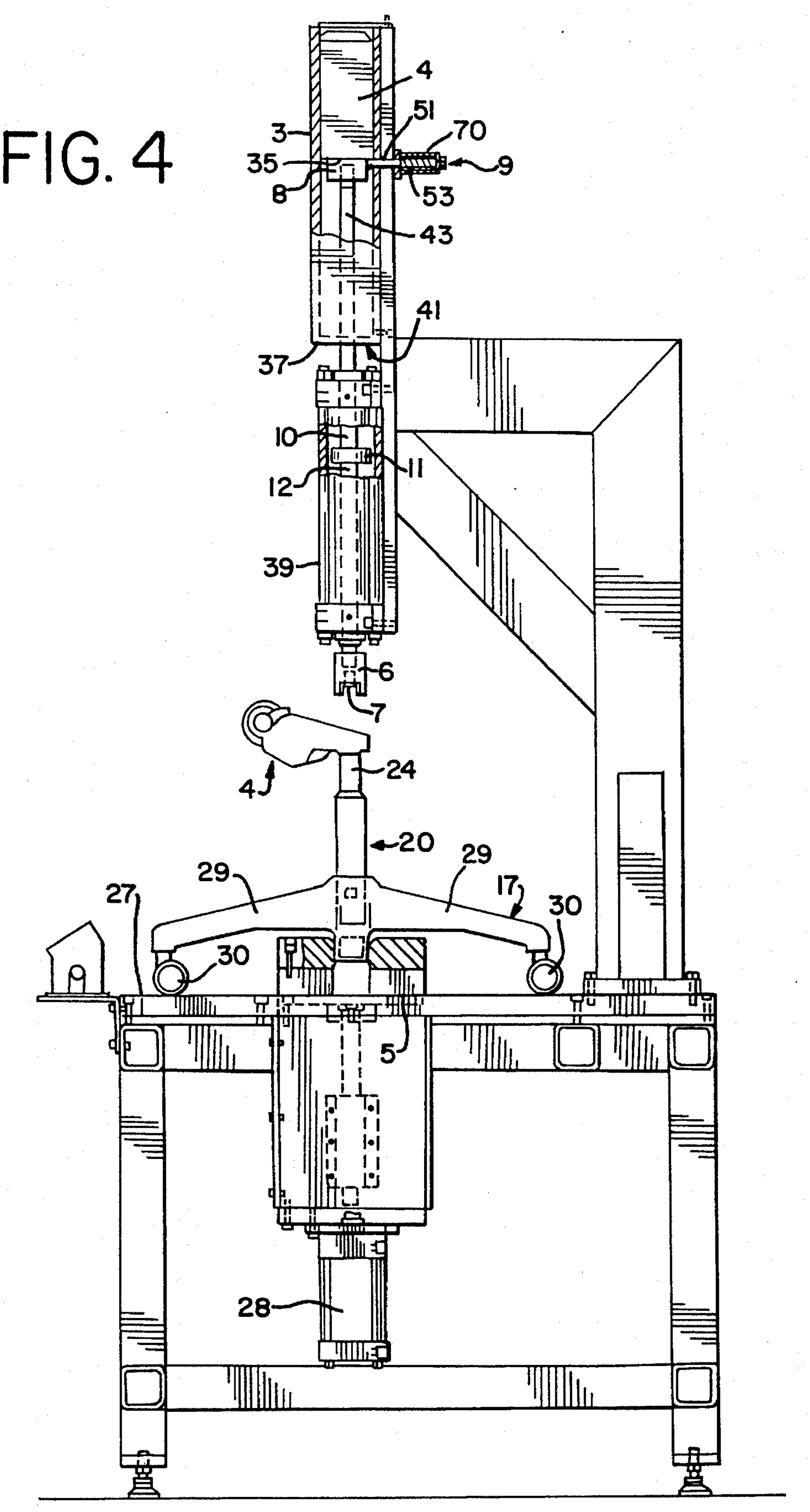
FIG. 4 is a partial sectional side view of the apparatus in a disengaged position with a base, support column and tilt-control housing applied thereto
Figure 4A:
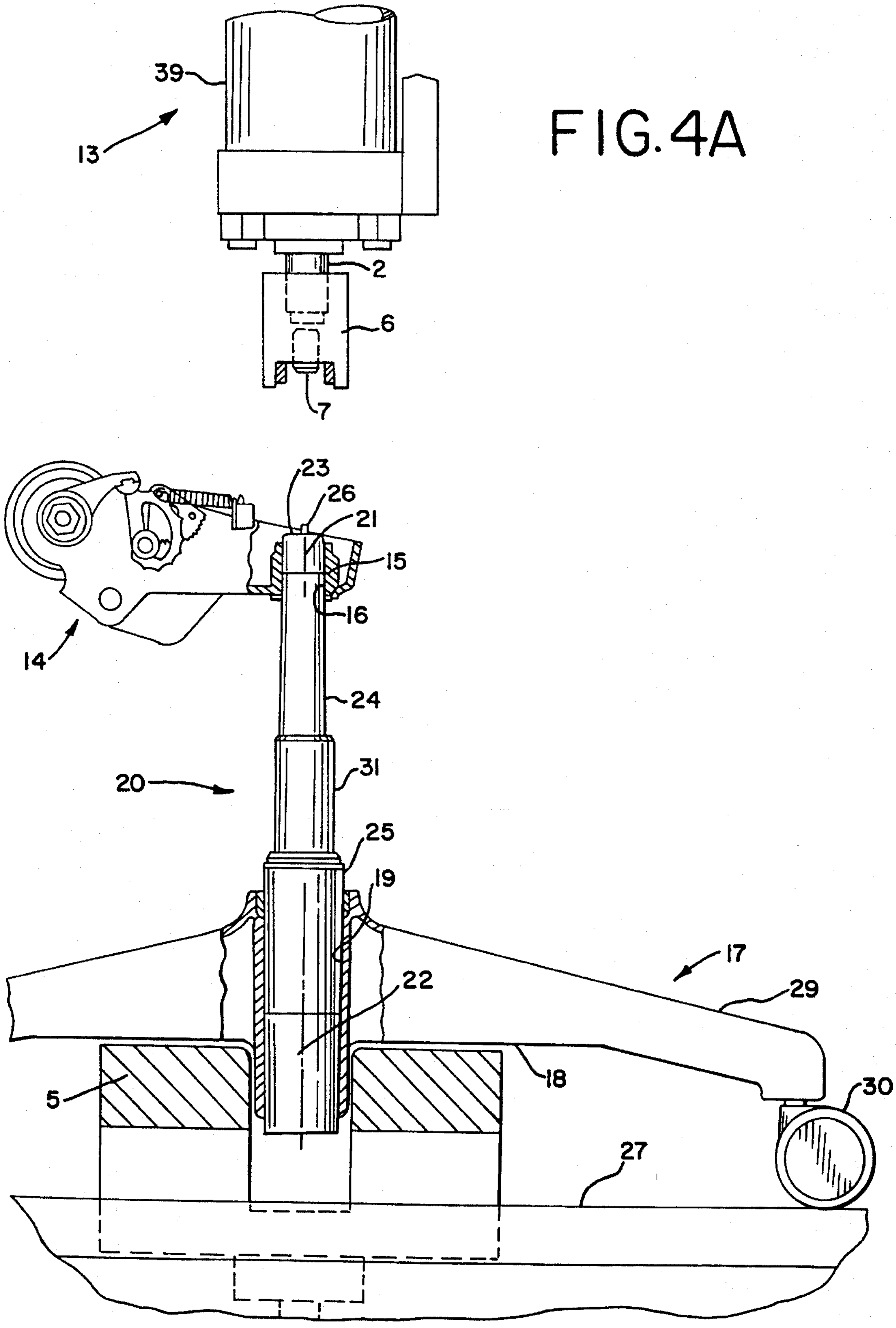
FIG. 4A is a detailed partial sectional view showing the tilt-control housing, support column, base and apparatus in a disengaged position.

Referring to the drawings, FIGS. 1 and 4 show an apparatus 1 for mounting a support column 20 to a chair base 17 and tilt-control housing 14. As shown in FIG. 4A, the support column has a top portion 21 and a bottom portion 22. The base 17 has a cavity 19 formed therein and a bottom side 18. The tilt-control housing 14 has a hub 15 defining a core 16. In an exemplary telescopic embodiment, the support column 20 includes a guide tube 25 and a telescopic tube 24 fitting within the guide tube 25. In this embodiment, which includes multiple tubes, a tube may function as both a guide tube and a telescopic tube. For example, as shown in FIG. 4A, an intermediate telescopic tube 31 is positioned within the guide tube 25, but also has the smaller diameter telescopic tube 24 positioned within it. It should be understood that in alternative embodiments, the intermediate telescopic tube may be omitted or duplicated, depending on the desired height characteristics of the support column. The support column may also consist of a single tube interconnecting the base and housing.

Figure 6:
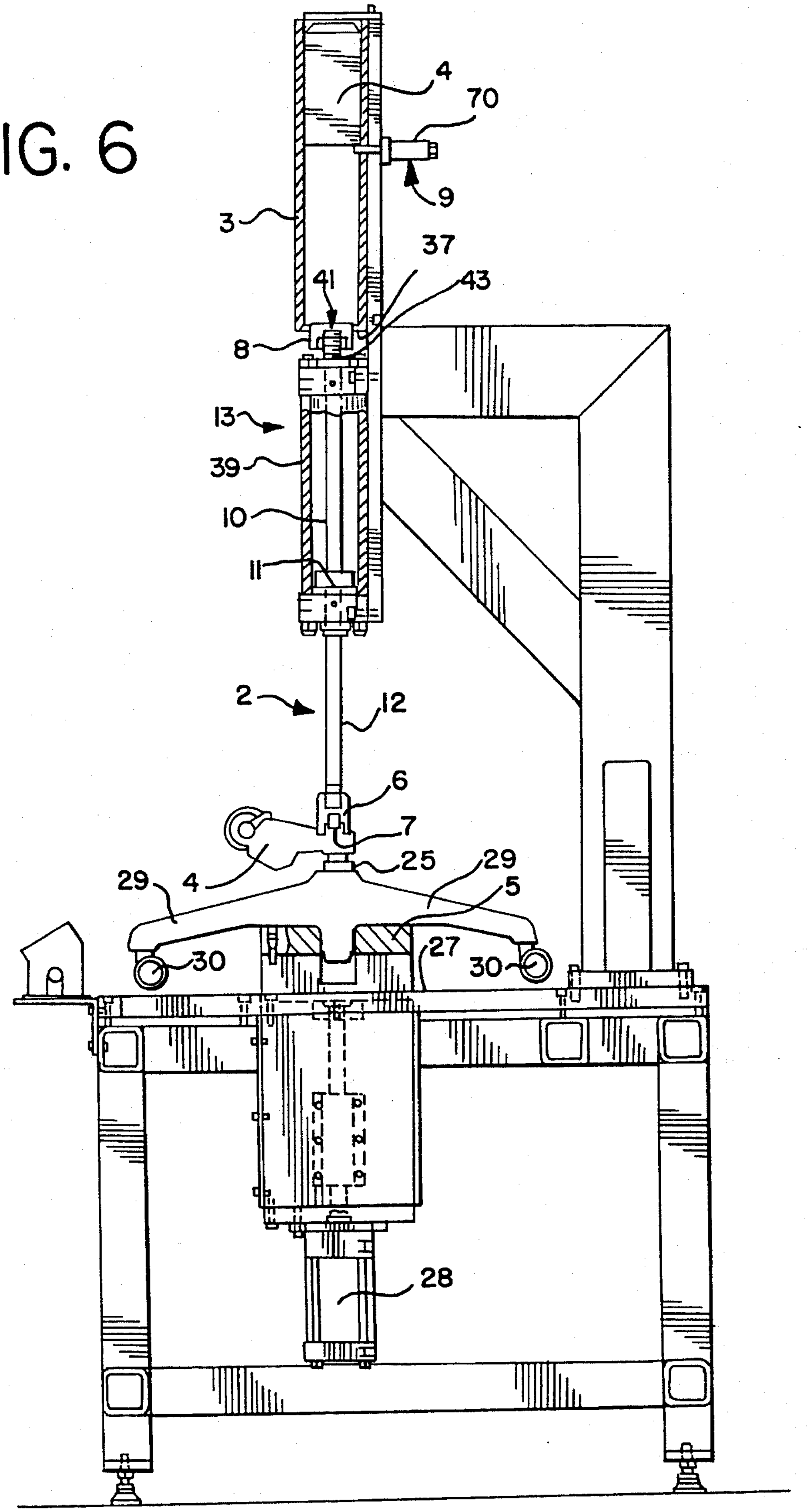
FIG. 6 is a partial sectional view showing the apparatus in an engaged position, with a base, support column and tilt-control housing applied thereto, with the support column in a collapsed position and with the mass in an upper position.
Figure 6A:
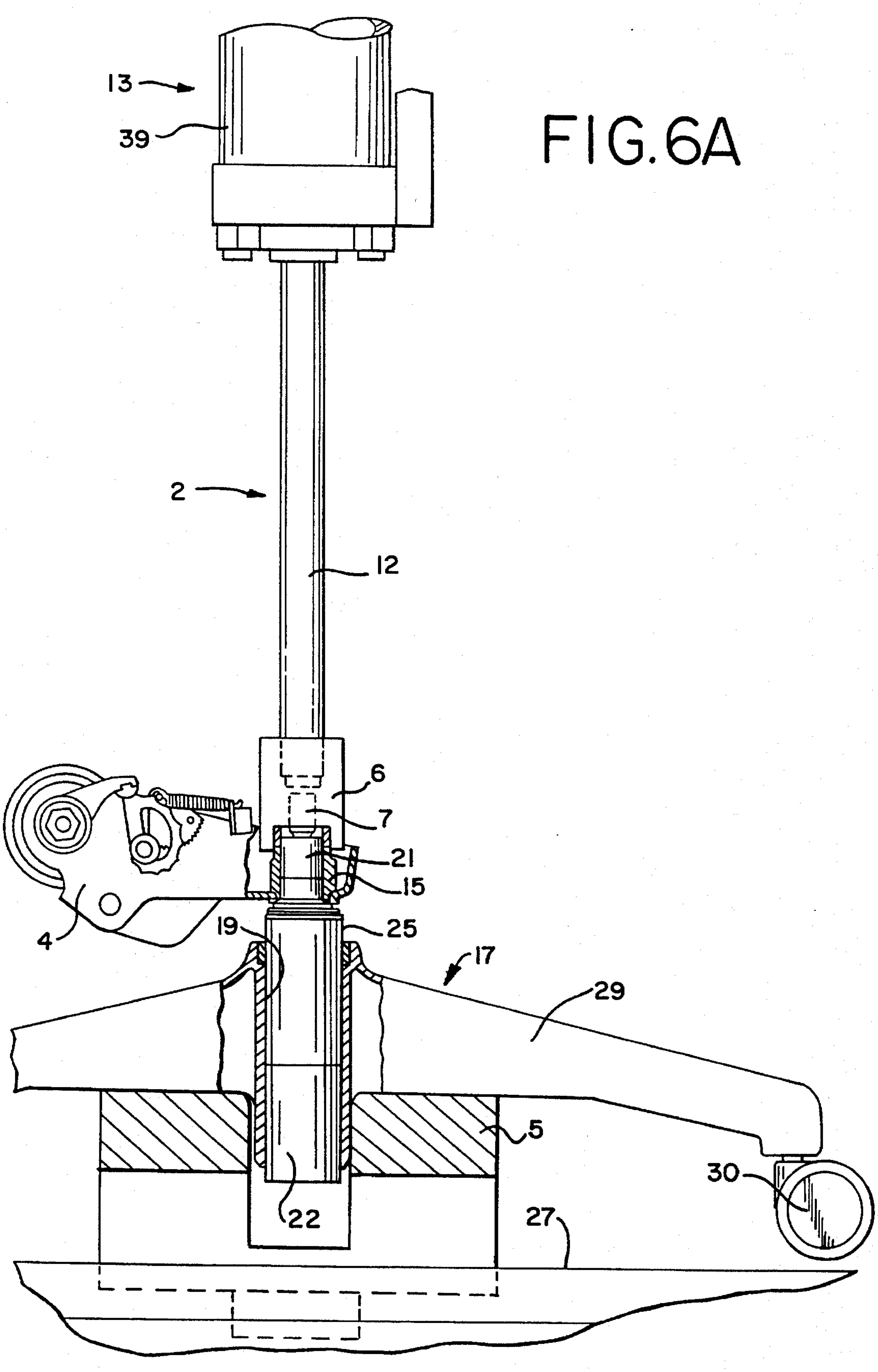
FIG. 6A is a detailed partial sectional view showing the apparatus in an engaged position and with the support column in a collapsed position.

The telescopic tube 24 has a control pin 26 extending upwardly from a top wall 23. When depressed, the control pin 26 actuates a gas spring contained within the support column 20. When the gas spring is actuated, the support column 20 can be compressed into a collapsed position by moving the telescopic tubes 24 and 31 within the guide tube 25 as shown in FIGS. 6 and 6A.

Figure 2:
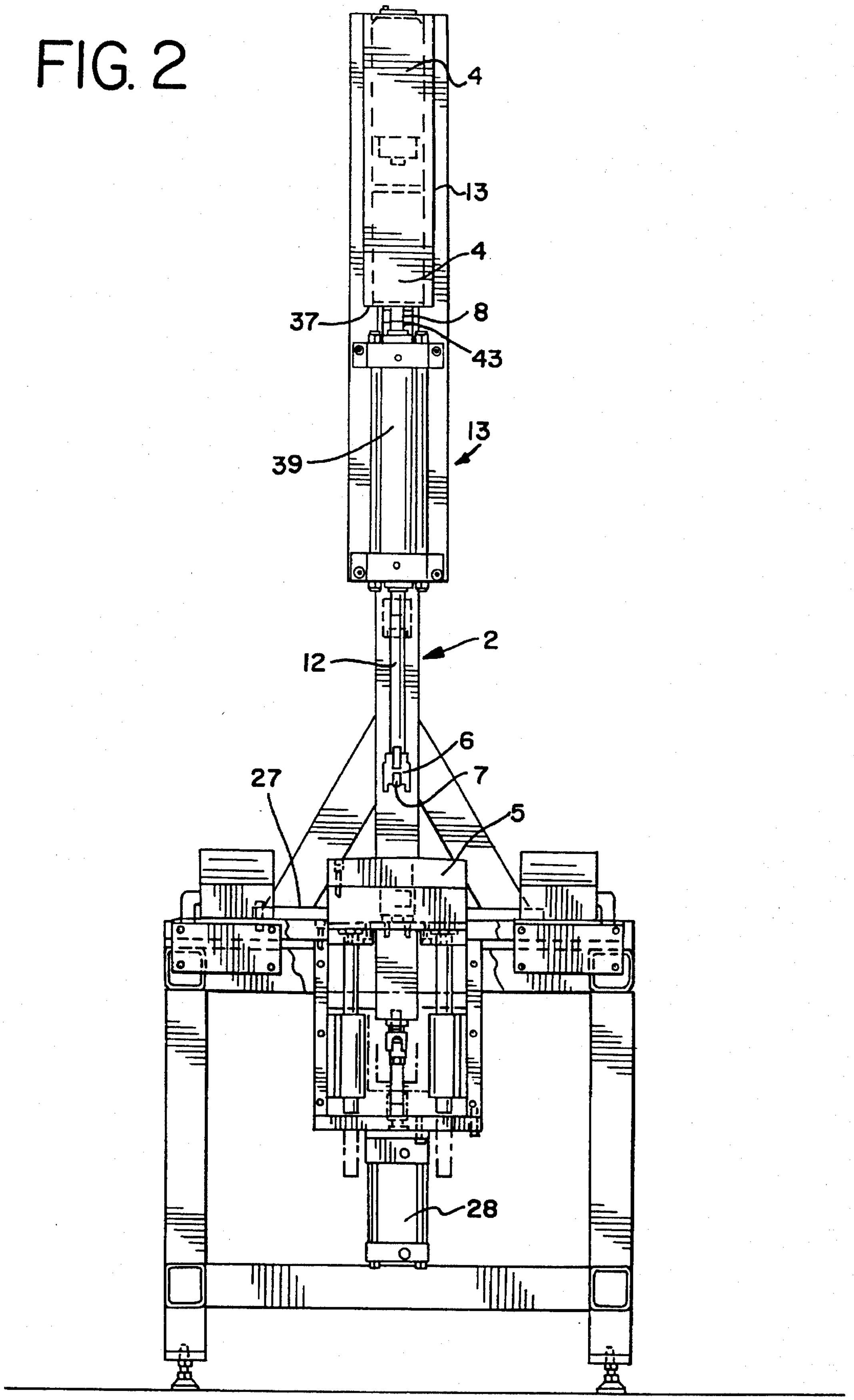
FIG. 2 is a front view of the apparatus.

Referring to FIGS. 1 and 2, the apparatus for mounting the support column 20 includes a support structure 5, adapted to support the bottom side 18 of the base 17, a vertical housing 3 positioned above the support structure and a vertical shaft 2 adapted to move downwardly to engage the tilt-control housing 14. As shown in FIG. 4, a mass 4 is positioned within the vertical housing 3 and is aligned to engage a top portion 8 of the vertical shaft 2 when released. When located in an upper position, the mass 4 can be secured by releasably locking it in place with a locking mechanism 9. In an exemplary embodiment, a spring-loaded retention cylinder 70 is attached to the vertical housing.

In this embodiment, the locking mechanism 9 includes a spring 53 and a retention member 51 disposed in the retention cylinder 70. The spring 53 biases the retention member 51 against the side of the mass 4 as it is raised to the upper position. When the mass 4 reaches the upper position, the spring 53 forces the retention member 51 into the vertical housing 3 and into engagement with a bottom side 35 of the mass 4. When pulled outwardly against the force of the spring 53, the retention member 51 disengages from the mass 4 and releases it.

Figure 5:
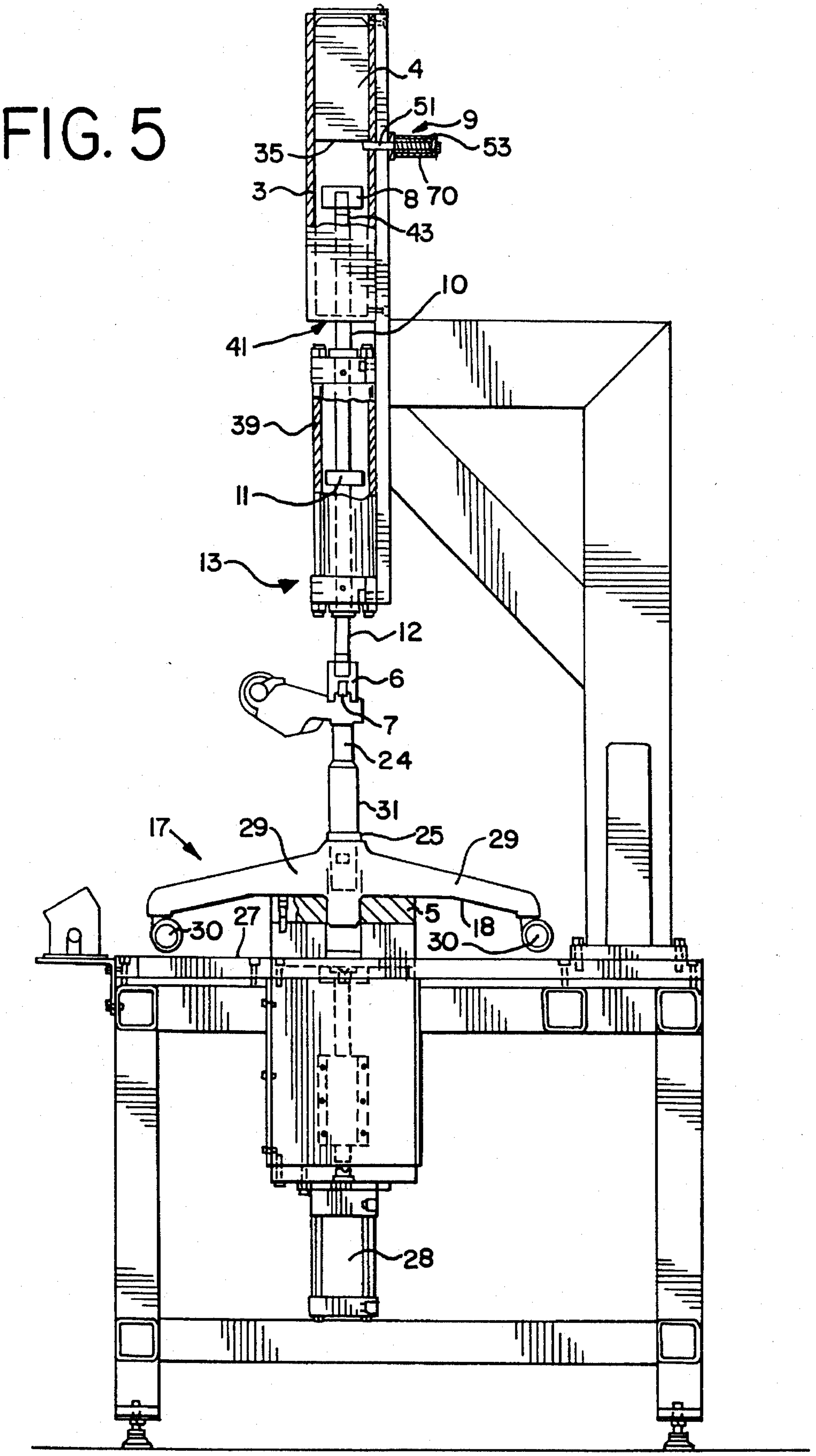
FIG. 5 is a partial sectional view of the apparatus in an engaged position with a base, support column and tilt-control housing applied thereto and with the support column in an extended position.

In a preferred embodiment, the vertical shaft 2 is moved vertically to engage the tilt-control housing 14 by a pneumatic cylinder assembly 13 positioned below the vertical housing 3 as shown in FIG. 5. The pneumatic cylinder assembly 13 includes a cylinder 39 and a piston 11. In this embodiment, the vertical shaft 2 includes a downwardly extending piston rod 12 connected to an upwardly extending piston rod 10. An upper portion 43 of the upwardly extending piston rod 10 extends upwardly out of the cylinder 39 and is received in an opening 41 in the lower wall 37 of the vertical housing 3. A portion of the downwardly extending piston rod 12 extends downwardly out of the cylinder 39. The piston 11 is positioned at the interface of the two interconnecting piston rods 10 and 12 as shown in FIG. 5. To operably engage the control pin 26 of the telescopic tube 24 and the tilt-control housing 14, the downwardly extending piston rod 12 has a collar 6 and a central plunger 7 attached to the end of it. The central plunger 7 is positioned within the circumference of the collar 6 as shown in FIG. 5A.

Figure 3:
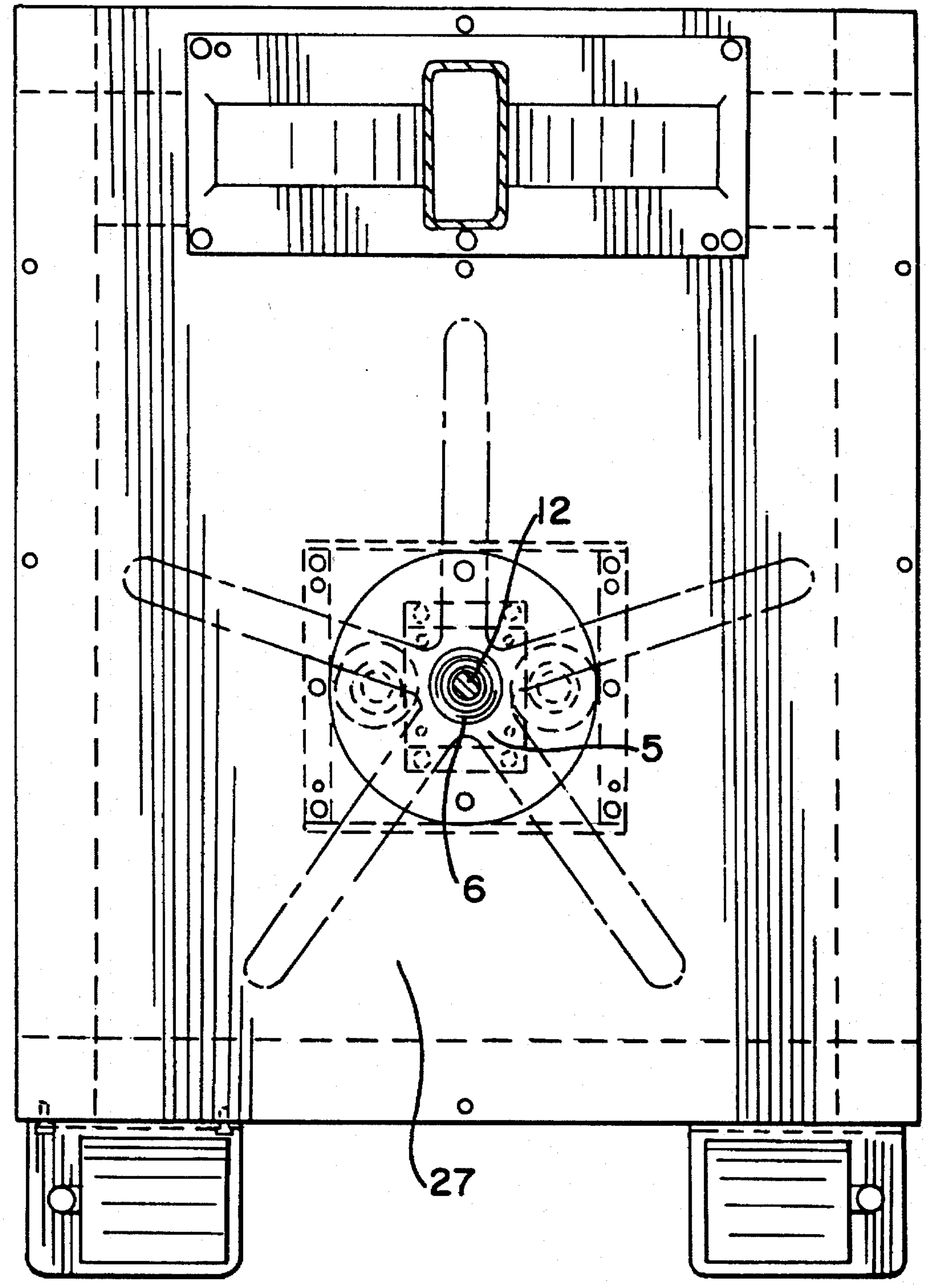
FIG. 3 is a sectional plan-view of the apparatus taken along line 3—3 shown in FIG. 1.
Figure 7:
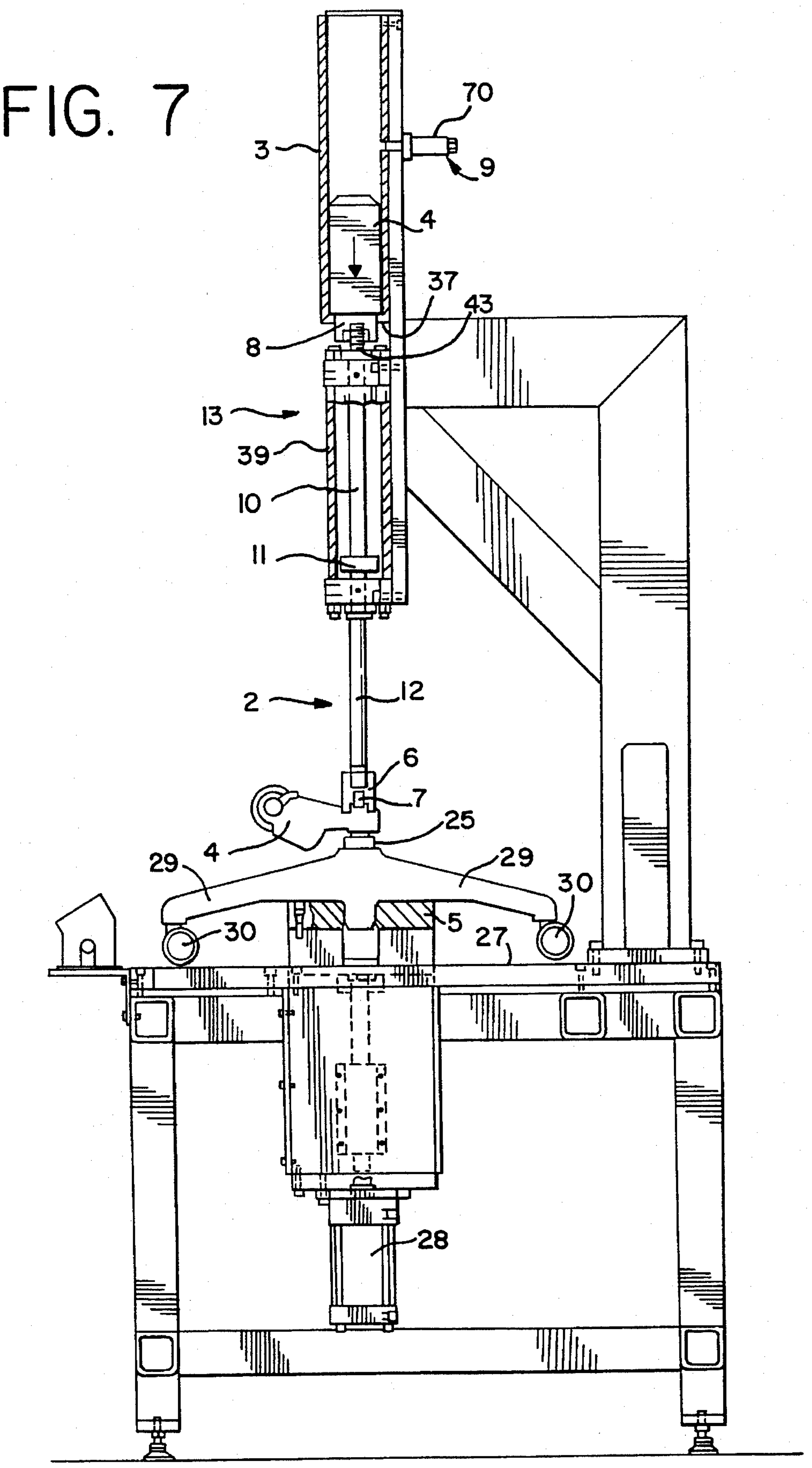
FIG. 7 is a partial sectional view showing the apparatus in an engaged position with a base, support column, and tilt-control housing applied thereto, with the support column in a collapsed position and with the mass impacting the vertical shaft.

In the operation of the foregoing preferred embodiment, the base is placed in the apparatus on a base plate 27 above a lower press cylinder 28 as illustrated in FIGS. 4 and 4A. For the purpose of illustration, a typical chair base 17 is shown in FIGS. 3 and 4 as having five arms 29 and five casters 30 attached to the arms. It should be understood, however, that the apparatus can be adapted to support and engage other types of chairs. The lower press cylinder 28 raises the support structure 5 to engage the bottom side 18 of the base 17. The lower press cylinder 28 raises the support structure 5 to a position wherein the base 17 is supported by only the support structure 5 as the casters 30 are lifted off of the base plate 27 as shown in FIGS. 6, 6A and 7. The bottom portion 22 of the support column 20 is placed in the cavity 19 of the base 17. The tilt-control housing 14 is then placed on the top portion 21 of the support column 20. The downwardly extending piston rod 12 is lowered to operably engage the tilt-control housing 14. In a preferred embodiment, the downwardly extending piston rod 12 is lowered by the pneumatic cylinder assembly 13.

Figure 5A:
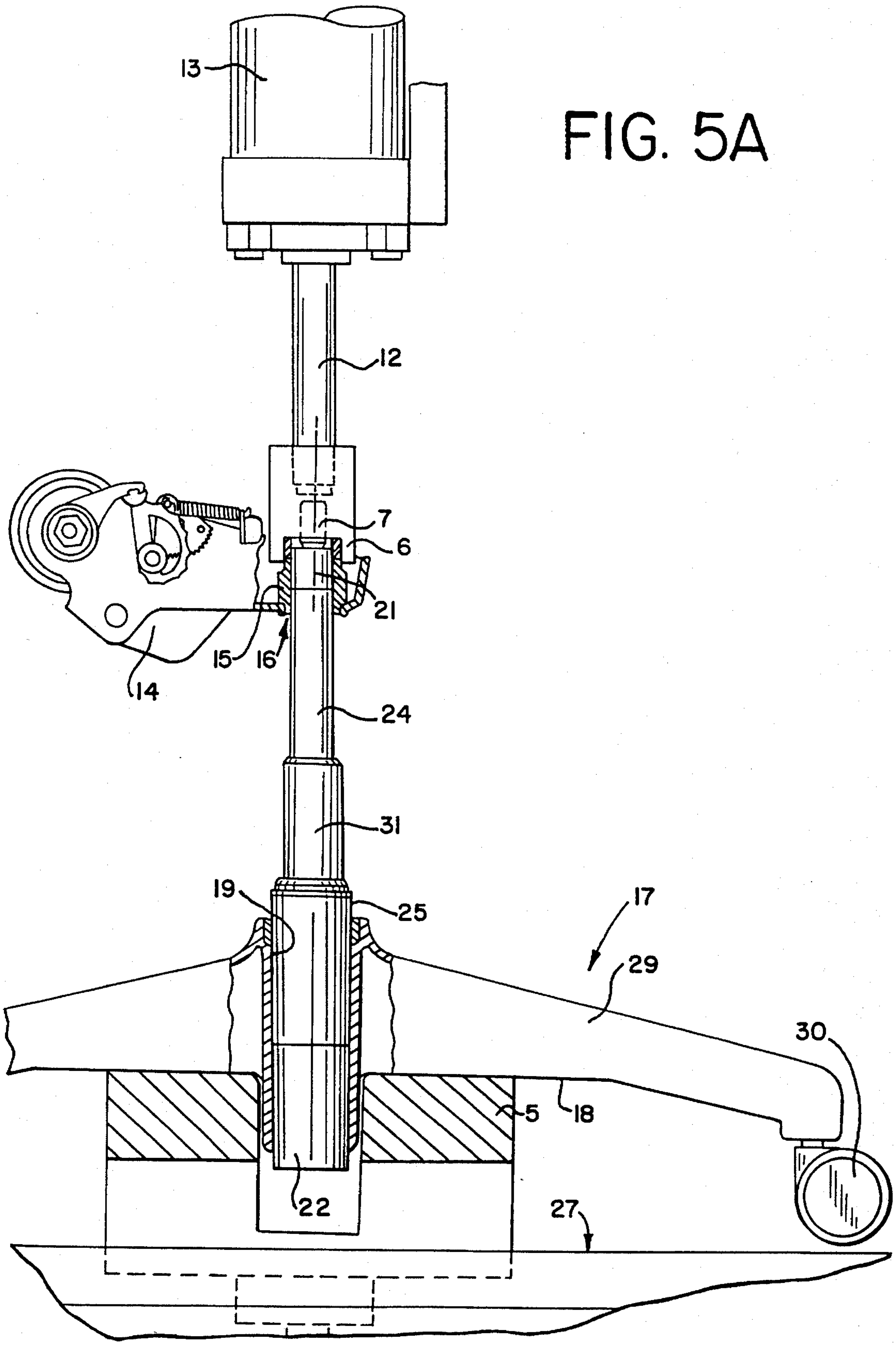
FIG. 5A is a detailed, partial sectional view showing the apparatus applied to the tilt-control housing and control pin in an engaged position.

When installing a support column 20 having telescopic tubes 24 and 31, the collar 6 attached to the downwardly extending piston rod 12 operably engages the hub 15 of the tilt-control housing 14 as shown in FIG. 5A. For maximum impact force, the support column 20 must be compressed into a collapsed position so that the gas spring does not absorb the energy of the impact. Such an energy absorption would increase the force required to firmly mount the support column 20 in the base 17 and tilt-control housing 14. In addition, the support column 20 can be damaged by the impact force if it is not in a collapsed position. As the collar 6 engages the hub 15 of the tilt-control housing 14, the central plunger 7 depresses the control pin 26. As shown in FIGS. 4A and 6A, the central plunger 7 is mounted to the collar 6.

In an exemplary embodiment, the central plunger 7 includes a ball bearing and a plunger spring, which biases the ball bearing against the control pin 26. This type of central plunger is commercially available, for example, from RTS and is designated as Stubby Spring Plunger No. K7-N. The central plunger 7 is used to ensure that the control pin 26 is fully depressed before collapsing the support column 20. The spring is used to prevent the impact force from being transmitted to the support column 20 by the central plunger 7 and thereby damaging the support column 20. To properly effectuate the load transfer, the collar 6 must be fully seated on the hub 15 as shown in FIG. 5A. This establishes a load path through the collar 6 and hub 15, rather than through the central plunger 7 and support column 20.

The pneumatic cylinder assembly 13 extends the downwardly extending piston rod 2 to collapse the support column 20 by moving the telescopic tubes 24 and 31 within the guide tube 25 as shown in FIGS. 6 and 6A. When the support column 20 is completely collapsed, a static force is applied by the pneumatic cylinder assembly 13 for a brief moment. This temporarily sets the tilt control housing, support column, and base in preparation for mounting. The locking mechanism 9 is then actuated to release the mass 4. The mass 4 falls due to the force of gravity, as shown in FIG. 7, and engages the top portion 8 of the upwardly extending piston rod 10, thereby transferring a dynamic impact force through the piston rods 10 and 12 to the hub 15 of the tilt-control housing 14 by way of the collar 6. For example, to firmly mount the five arm base 17 and the tilt control housing 14 depicted in FIGS. 1–7, a 13 lbs. mass 4 is dropped from a distance of about 10.75 inches. This arrangement has a potential energy of about 140 in-lb which is converted to kinetic energy and absorbed by the column at the time of impact. Depending on the application or type of support column being mounted, other masses or distances can be used to increase or decrease the impact force accordingly. Typically, a range of about 10 to 11.5 inches is used with a 13 lbs. mass when assembling telescopic support columns. The impact force simultaneously press fits the top portion 21 of the support column 20 within the hub 15 and the bottom portion 22 of the support column 20 within the cavity 19 of the base 17.

The pneumatic cylinder assembly 13 can then be activated to lift the mass 4 to an upper position by operably engaging the mass 4 with the top portion 8 of the upwardly extending piston rod 10. When located in the upper position, the locking mechanism 9 is engaged to releasably lock the mass 4 in the upper position. In turn, this allows the vertical shaft 2, or piston rods 12 and 10, to be lowered once again to operably engage another tilt-control housing 14 without simultaneously allowing the mass 4 to follow by the force of gravity. Accordingly, the mass 4 is retained in the upper position until released for another mounting operation.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A method of mounting a support column to a chair base and tilt-control housing, said support column having a top portion and a bottom portion, said base having a cavity formed therein, and said tilt control housing having a hub defining a core, the method comprising:

placing a bottom portion of the support column within the cavity of the base;

placing the hub of the tilt control housing onto the top portion of the support column such that said top portion is positioned within the core of the hub;

supporting a bottom side of the base; and applying an impact force against the tilt-control housing to simultaneously press fit the top portion of the support column within the hub and the bottom portion of the support column within the cavity.

2. The method of claim 1 wherein the support column comprises a telescopic tube within a guide tube, said telescopic tube having a control pin extending upwardly through a top wall thereof for actuating a gas spring, further comprising the step of depressing the control pin to collapse the support column prior to applying said impact force.

3. The method of claim 2 further comprising the step of maintaining the depression of the control pin after the column has collapsed while applying the impact force.

4. The method of claim 2 wherein the step of depressing the control pin comprises extending a downwardly extending piston rod downwardly against the control pin from a pneumatic cylinder assembly.

5. The method of claim 4 wherein the step of applying the impact force comprises applying said force through said downwardly extending piston rod and against the hub of the tilt-control housing.

6. The method of claim 5 wherein the step of applying the impact force comprises dropping a mass against an upwardly extending piston rod of the pneumatic cylinder assembly, said upwardly extending piston rod being connected to said downwardly extending piston rod which is extended downwardly against the control pin and the hub.

7. The method of claim 1 wherein the step of applying an impact force comprises dropping a mass against the tilt-control housing.

8. The method of claim 7 further comprising the steps of raising the mass to an upper position after it has been dropped in order to position said mass for another mounting operation and releasably locking the mass when it reaches the upper position.

9. A method of mounting a support column to a chair base and tilt-control housing, said base having a cavity formed therein, said tilt-control housing having a hub defining a core, and said support column having a telescopic tube within a guide tube, the telescopic tube having a control pin extending upwardly through a top wall thereof for actuating a gas spring, the method comprising:

placing a bottom portion of the guide tube within the cavity of the base;

placing the hub of the tilt-control housing onto a top portion of the telescopic tube such that said top portion is positioned within the core of the hub;

supporting a bottom side of the base;

depressing the control pin to collapse the support column;

applying an impact force against the hub of the tilt-control housing to simultaneously press fit the top portion of the telescopic tube within the hub and the bottom portion of the guide tube within the cavity.

10. The method of claim 9 wherein the step of depressing the control pin further comprises extending a downwardly extending piston rod downwardly against the control pin from a pneumatic cylinder assembly.

11. The method of claim 10 wherein the step of applying the impact force comprises applying said force through said downwardly extending piston rod and against the hub of the tilt-control housing.

12. The method of claim 11 wherein the step of applying the impact force comprises dropping a mass against an upwardly extending piston rod of the pneumatic cylinder assembly, said upwardly extending piston rod being connected to said downwardly extending piston rod which is extended downwardly against the control pin and the hub.

13. The method of claim 12 further comprising the steps of raising the mass to an upper position after it has been dropped in order to position said mass for another mounting operation and releasably locking the mass when it reaches the upper position.

14. A method of mounting a support column to a chair base and tilt-control housing, said base having a cavity formed therein, said tilt-control housing having a hub defining a core, and said support column having a telescopic tube within a guide tube, the telescopic tube having a control pin extending upwardly through a top wall thereof for actuating a gas spring, the method comprising:

placing a bottom portion of the guide tube within the cavity of the base;

placing the hub of the tilt housing onto a top portion of the telescopic tube such that said top portion is positioned within the core of the hub;

supporting a bottom portion of the base;

extending a downwardly extending piston rod downwardly from a pneumatic cylinder assembly into engagement with the hub of the tilt-control housing and simultaneously into engagement with the control pin to collapse the support column;

dropping a mass against an upwardly extending piston rod connected to said downwardly extending piston rod, said mass providing an impact force through said piston rods and against the hub of the tilt-control housing to simultaneously press fit the top portion of the telescopic tube within the hub and the bottom portion of the guide tube within the cavity.

15. The method of claim 14 further comprising the steps of moving the piston rods upwardly to raise the mass to an upper position after it has been dropped in order to position said mass for another mounting operation and releasably locking the mass when it reaches the upper position.

16. An apparatus for mounting a support column to a chair base and tilt-control housing, said base having a cavity formed therein, said tilt-control housing having a hub defining a core, and said support column having atop portion positioned within the core of the hub and a bottom portion positioned within the cavity of the base, the apparatus comprising:

a support structure adapted to support a bottom side of the base;

a vertical shaft adapted to move downwardly into operable engagement with the tilt-control housing; and a mass positioned within a vertical housing above and in alignment with the shaft, said mass adapted to fall by gravity into engagement with a top portion of the shaft to transfer an impact force through the shaft and simultaneously press fit the top portion of the column within the hub and the bottom portion of the column within the cavity.

17. The apparatus of claim 16 wherein the support column comprises a telescopic tube within a guide tube, said telescopic tube having a control pin extending upwardly through a top wall thereof for actuating a gas spring, and wherein the vertical shaft is adapted to depress the control pin simultaneously with engaging the tilt-control housing to collapse the support column prior to the falling of said mass.

18. The apparatus of claim 17 wherein a lower end portion of the vertical shaft comprises a collar adapted to operably engage the hub of the tilt-control housing, and a central plunger positioned within the circumference of the collar, said plunger adapted to operably engage the control pin when the collar engages the hub.

19. The apparatus of claim 16 wherein the vertical shaft is moved vertically by a pneumatic cylinder assembly positioned below said vertical housing.

20. The apparatus of claim 19 wherein the vertical shaft comprises a downwardly extending piston rod connected to an upwardly extending piston rod, and a piston positioned between the piston rods, said upwardly extending piston rod adapted to raise the mass to an upper position after it has fallen in order to position said mass for another mounting operation.

21. The apparatus of claim 20 further comprising a mechanism for releasably locking the mass when it reaches the upper position.

22. An apparatus for mounting a support column to a chair base and tilt-control housing, said base having a cavity formed therein, said tilt-control housing having a hub defining a core, and said support column having atop portion positioned within the core of the hub and a bottom portion positioned within the cavity of the base, the apparatus comprising:

a support structure adapted to support a bottom portion of the base;

a pneumatic cylinder assembly positioned vertically above the support structure, said pneumatic cylinder assembly having a cylinder, a downwardly extending piston rod connected to an upwardly extending piston rod, and a piston positioned between said piston rods, a portion of said downwardly extending piston rod extending downwardly out of said cylinder and an upper portion of said upwardly extending piston rod extending upwardly out of said cylinder;

a vertical housing positioned above and in alignment with the cylinder assembly, said housing having an opening in a lower wall thereof for receiving the upper portion of the upwardly extending piston rod;

a mass positioned within the vertical housing and adapted to fall by gravity into engagement with a top portion of the upwardly extending piston rod; and a mechanism for releasably locking the mass in an upper position;

whereby the downwardly extending piston rod is moved downwardly into contact with the tilt housing, the mass is released so that it falls from the upper position into contact with the top portion of the upwardly extending piston rod thereby transferring an impact force through the piston rods to simultaneously press fit the top portion of the column within the hub and the bottom portion of the column within the cavity, and the upwardly extending piston rod is moved upwardly into contact with the mass to raise the mass to the upper position.

23. The apparatus of claim 22 wherein the support column comprises a telescopic tube within a guide tube, said telescopic tube having a control pin extending upwardly through a top wall thereof for actuating a gas spring, and wherein the downwardly extending piston rod is adapted to depress the control pin simultaneously with engaging the tilt-control housing to collapse the support column prior to releasing said mass.

24. The apparatus of claim 23 wherein a lower end portion of the downwardly extending piston rod comprises a collar adapted to operably engage the hub of the tilt-control housing, and a central plunger positioned within the circumference of the collar, said plunger adapted to operably engage the control pin when the collar engages the hub.

* * * * *